United States Patent
Ratti et al.

(10) Patent No.: US 7,181,362 B2
(45) Date of Patent: Feb. 20, 2007

(54) THREE DIMENSIONAL TANGIBLE INTERFACE FOR INTERACTING WITH SPATIAL-TEMPORAL DATA USING INFRARED LIGHT SOURCES AND INFRARED DETECTORS

(75) Inventors: Carlo Filippo Ratti, Turin (IT); Benjamin Tarquinn Fielding Piper, London (GB); Hiroshi Ishii, Boston, MA (US); Yao Wang, Cambridge, MA (US); Assaf Biderman, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 559 days.

(21) Appl. No.: 10/825,702

(22) Filed: Apr. 16, 2004

(65) Prior Publication Data

US 2005/0013477 A1    Jan. 20, 2005

Related U.S. Application Data

(63) Continuation-in-part of application No. 10/696,474, filed on Oct. 29, 2003.
(60) Provisional application No. 60/463,357, filed on Apr. 17, 2003, provisional application No. 60/463,273, filed on Apr. 16, 2003.

(51) Int. Cl.
*G01C 9/00* (2006.01)
(52) U.S. Cl. .............................. 702/152; 702/159
(58) Field of Classification Search ................ 702/152, 702/159
See application file for complete search history.

(56) References Cited

U.S. PATENT DOCUMENTS

| | | | | |
|---|---|---|---|---|
| 5,661,667 | A * | 8/1997 | Rueb et al. | 702/95 |
| 6,023,278 | A * | 2/2000 | Margolin | 345/419 |
| 6,229,546 | B1 * | 5/2001 | Lancaster et al. | 345/419 |
| 7,103,499 | B2 * | 9/2006 | Goodwin et al. | 702/152 |
| 2005/0273254 | A1 * | 12/2005 | Malchi et al. | 701/207 |

* cited by examiner

*Primary Examiner*—John E. Barlow, Jr.
*Assistant Examiner*—Aditya S. Bhat
(74) *Attorney, Agent, or Firm*—Charles G. Call

(57) ABSTRACT

An interface that allows a user to model and analyze the properties of three dimensional surface and the regions surrounding such surfaces. The user manipulates a deformable bed of translucent glass beads that defines the geometry of a surface. An array of light emitting diodes underneath the beads transmits infrared light upwardly through the beads such that the intensity of radiation from each position on the surface of the beads is related to the depth of the beads at that position. A digital camera captures radiation image data which is then processed to create elevation data specifying the geometry of the surface. A processor processes the elevation data using a selected analysis function to produce result data representing computed characteristics of the surface or its surrounding region. The result data is projected as an image onto the surface of the beads. The interface permits the user to modify a surface geometry and directly visualize the characteristics of the modified geometry in real time.

27 Claims, 2 Drawing Sheets

THREE DIMENSIONAL TANGIBLE INTERFACE FOR INTERACTING WITH SPATIAL-TEMPORAL DATA USING INFRARED LIGHT SOURCES AND INFRARED DETECTORS

CROSS REFERENCE TO RELATED APPLICATIONS

This application is a continuation in part of U.S. patent application Ser. No. 10/696,474 filed on Oct. 29, 2003 and claims the benefit of the filing date thereof. This application also claims the benefit of the filing date of U.S. Provisional Patent Application Ser. No. 60/463,273 filed Apr. 16, 2003, and further claims the benefit of the filing date of U.S. Provisional Patent Application Ser. No. 60/463,357 filed Apr. 17, 2003. The disclosure of each of the foregoing applications is incorporated herein by reference.

The above noted provisional application Ser. No. 60/463,357 describes the subject matter of this application: a system called "Sandscape" which employs an infrared camera that captures an image of the light radiated by a bed of translucent beads illuminated by an LED array and then processes the image data to analyze the physical structures and their surroundings, such as landscapes and architectural structures, modeled by the beads.

The above-noted provisional application Ser. No. 60/463,273 and a corresponding utility application Ser. No. 10/825,701 entitled "A three dimensional tangible interface for interacting with spatial-temporal data using a laser scanner" filed concurrently with this application, describe a alternative system called "Illuminated Clay" which employs a laser scanner and a deformable plastic material such as clay or plasticine for modeling and analyzing physical structures and their surroundings.

The above noted application Ser. No. 10/696,474 describes methods and apparatus called a "Phoxel Space Interface" that enable a user to intuitively explore and visualize complex three dimensional datasets by manipulating the position and shape of a physical modeling surface.

FIELD OF THE INVENTION

This invention relates to systems for modeling physical forms such as landscapes and exploring their characteristics by computational analysis.

BACKGROUND AND SUMMARY OF THE INVENTION

Landscape engineering typically deals with large land areas and requires the input of several specialists. These include experts in earth engineering, water management, agrarian management, land economy, legal policy and transport infrastructure to name just a few. Furthermore, landscape interventions inevitably affect large numbers of people living on or near a particular sight. It is often critical for the designers of a landscape project to communicate their vision to the local inhabitants. It is therefore desirable that the tools used by landscape designers and engineers allow various specialists and lay people to participate in a collaborative design process.

Engineers and designers involved in landscape, architectural and industrial projects continue to put great emphasis on the use of physical models, even though computer simulation techniques which provide virtual visualizations are increasingly available. Road engineers employ physical models to better understand complex topographies. Contemporary landscape designers often insist on using physical models (which may be later digitized) in the early stages of design exploration, in the same way that automobile designers still work extensively with physical, tape and clay models, even though they have access to sophisticated computer techniques for modeling curved-surfaces.

There is great efficiency in representing spatial constructs with physical, tangible models since physical models are themselves spatial constructs differing only in scale or material from the final outcome of a design. Physical models offer an intuitive understanding of complex geometries and physical relationships that are difficult, and sometimes impossible, to effectively describe in any other way.

On the other hand, computer based models, while commonly being limited to producing two-dimensional, visual representations, offer many advantages over the physical model. The dynamic quality of the screen allows computational systems to represent entities or forces that change over time. They offer a vast increase in the efficiency of production, reproduction and distribution of models. They also offer the ability to work directly with numeric data and at accuracies that far surpass the tolerances of most physical models.

The recent explosion in mapping, scanning and positioning technologies has led to a wealth of useful landscape data, including high-resolution topographical maps, information on soil types, population densities, variance in vegetation species and so forth. There has also been great progress in the methods used to analyze such data. Landscape designers and engineers are now able to simulate the results of their decisions using the power of computation.

Despite this progress, there has been relatively little development in the interface through which landscape based information is presented and manipulated. Most three-dimensional renderings and simulations are still viewed in two-dimensions on a computer screen or on paper. It is an object of the present invention to improve that interface.

Consider the following scenario: A group of road builders, environmental engineers and landscape designers stand at an ordinary table on which is placed a clay model of a particular site in the landscape. Their task is to design the course of a new roadway, housing complex and parking area that will satisfy engineering, environmental and aesthetic requirements. Using her finger, the engineer flattens out the side of a hill in the model to provide a flat plane for an area of car parking. As she does so, an area of yellow illumination appears in another part of the model. The environmental engineer points out that this indicates a region of severe land erosion caused by the change in the terrain and resulting flow of water. The landscape designer suggests that this erosion could be avoided by adding a raised earth mound around the car park. The group tests the hypothesis by adding material to the model and all three observe the affect on the process of erosion over time.

The scenario described above is one example of how the principles of the present invention may be applied to simulate dynamic characteristics by projecting computed representations of those characteristics directly onto the surface of a malleable three-dimensional physical model.

Others have sought human-computer interfaces that would better deal with three-dimensional forms, but the prevalent use of the two-dimensional computer screen has made it difficult to combine the benefits of physical and digital models in the same representation.

Frazier's Three-Dimensional Data Input Devices as presented in Computers/Graphics in the Building Process, Washington (1982) and more recently Gorbet's Triangles described by Gorbet, M., Orth, M. and Ishii, H. in "Triangles. Tangible Interface for Manipulation and Exploration of Digital Information Topography," Proceedings of Conference on Human Factors in Computing Systems (CHI '98), (Los Angeles, April 1998), ACM Press, 49–56, have explored approaches to parallel physical/digital interactions.

The Tangible User Interface described by Ullmer, B., and Ishii, H. in "Emerging Frameworks for Tangible User Interfaces," IBM Systems Journal 393, 3, 2000, 915–931, is being increasingly accepted as an alternative paradigm to the more conventional Graphical User Interface (GUI), where the ability to manipulate objects in space is more fully utilized.

Wellner's Digital Desk described by P. Wellner in "Interacting with Paper on the DigitalDesk." Communications of the ACM 36, 7, 86–96 (July 1993). illustrates the efficiencies of augmenting paper based office production with digital tools and methods for storage. Similarly Hinckley's neurosurgical interface described by K. Hinckley, R. Pausch, J. Goble and N. Kassell in "Passive Real-World Interface Props for Neurosurgical Visualization," Proceedings of Conference on Human Factors in Computing Systems (CHI '94), ACM Press, 452–458, uses a position tracked doll's head and knife to allow users to dissect a graphical representation of the brain.

There have also been a number of impressive developments in combined graphical/physical interactions. Systems such as the Phantom Arm offered by SensAble Devices, http://www.sensable.com/, when combined with virtual environments or holography as describe by W. J. Plesniak in "Haptic holography: an early computational plastic," Ph.D. Thesis, Program in Media Arts and Sciences, Massachusetts Institute of Technology, Cambridge, Mass. June 2001. allow for highly convincing interactions.

Special note is due to the work of John Underkoffler, called "The Urban Design Workbench," which directly inspired the approach used in the present invention, and was described by J. Underkoffler and H. Ishii in "Urp: A Luminous-Tangible Workbench for Urban Planning and Design," Proceedings of Conference on Human Factors in Computing Systems (CHI '99), Pittsburgh, Pa. USA, May 15–20, 1999, ACM Press, 386–393. The Urban Design Workbench uses digitally augmented tagged physical objects to represent buildings that can be rearranged to facilitate the process of urban design. Each of these approaches illustrates the enhanced interactions that are afforded by the use of tangible objects in human computer interaction. It is the goal of the present invention to combine the benefits of these approaches and provide an improved interface of practical value in the context of landscape analysis and other fields that offer similar challenges.

The present invention takes the form of a human-computer interface that computationally analyzes three-dimensional data using a malleable physical representation such as a bed of glass beads. A user of the interface directly manipulates the form of one or more physical objects while their changing geometry is captured in digital form and computationally analyzed in real time, and the results of the computation are projected back onto the physical modeling surface. The interface contemplated by the invention takes advantage of a human user's natural ability to understand and manipulate physical forms while harnessing the power of computational analysis to visually display meaningful data on the surface of these forms.

The invention may be used to advantage in a variety of applications. As described in detail below, the invention may be used to particular advantage in architectural and landscape design by employing selected, available simulation techniques to evaluate physical characteristics of a modeled form (e.g. elevation, curvature, contours, shadow, water flows) to better understand the behavior of different structures and terrains under different conditions.

This invention offers an intuitive alternative for modeling and analyzing three-dimensional objects and forms, such as architectural and landscape models, where a mesh surface is automatically generated in real time according to the changing geometries of physical surfaces and used to update computational simulations. This approach allows users to quickly create and understand highly complex topographies that would be time consuming and require an inappropriate degree of precision if produced using mice and keyboards in conventional CAD tools.

The present invention differs from existing approaches that employ position-tracked objects to capture position, form and shape data by instead directly detecting the surface geometry of a malleable object or set of objects, creating a seamless interface that allows engineers and designers to simultaneously interact with physical and digital forms of representation.

The present invention takes the form of methods and apparatus for modeling and evaluating the characteristics of three-dimensional forms. In accordance with a feature of the invention, a deformable translucent material that may be manually shaped is employed to define a modeling surface. Electromagnetic energy, preferably infrared light, is transmitted through the deformable material to produce radiation from individual regions of the modeling surface having an intensity that is related to the position of the region on the surface. The intensity of the radiation at different positions on the surface is measured, preferably by a digital camera, to produce radiation intensity data that is translated into elevational data that defines the geometry of the modeling surface. The elevational data is then processed to generate result data which specifies one or more characteristics at different points on or near said surface. A visual image corresponding to the result data is then projected onto the modeling surface. In this way, a user can form and modify the modeling surface by hand, and immediately view the computed characteristics of the modeled surface directly on its surface.

The preferred embodiment of the invention described in detail below employs the combination of an overhead camera to capture the surface geometry of a user-manipulated, deformable bed of translucent glass beads which defines a modeling surface, a processor for analyzing the captured surface geometry data in real-time to produce result data, and a video projector for illuminating the physical modeling surface formed by the beads with a visual representation of the result data.

The physical model creates and conveys spatial relationships that can be intuitively and directly manipulated by the user's hands. This approach allows users to quickly define and understand highly complex topographies that would be time consuming and require an inappropriate degree of precision if produced using conventional CAD tools. This alternative vision makes better use of the user's instinctive abilities to discover solutions through the manipulation of physical objects and materials.

These and other features and advantages of the present invention may be more clearly understood by considering the following detailed description of a specific embodiment of the invention.

BRIEF DESCRIPTION OF THE DRAWINGS

In the detailed description which follows, frequent reference will be made to the attached drawings, in which.

DETAILED DESCRIPTION

The preferred embodiment of the invention performs real-time computational analysis of landscape models. It is to be understood, however, that the techniques employed are more broadly applicable to a variety of uses which benefit from the availability of a human-computer interface that enables the user to define geometric forms by manipulating a deformable surface to change its shape, and to directly visualize computed result data that is projected in real time onto the surface of the deformable surface. In addition to landscape design, the interface can be used to advantage in medical imaging, free-form architectural construction, fluid dynamics modeling, and many other domains that require an understanding of special and temporal factors manifested in three dimensional space.

When applied to the problem of landscape design, the specific embodiment described below, which is called "Sandscape," allows a landscape designer to modify the topography of a translucent glass beads landscape model while the changing geometry of the model is captured in real-time by the combination of a ceiling-mounted digital camera and a processor which converts the surface radiance image captured by the camera into an Digital Elevation Model (DEM). The captured elevational data that describes the surface of the model serves as input data for use with a library of landscape analysis functions that can be executed by a connected processor in real time, with the results of the analysis being projected back onto and registered with the surface of the model.

Figure 1:
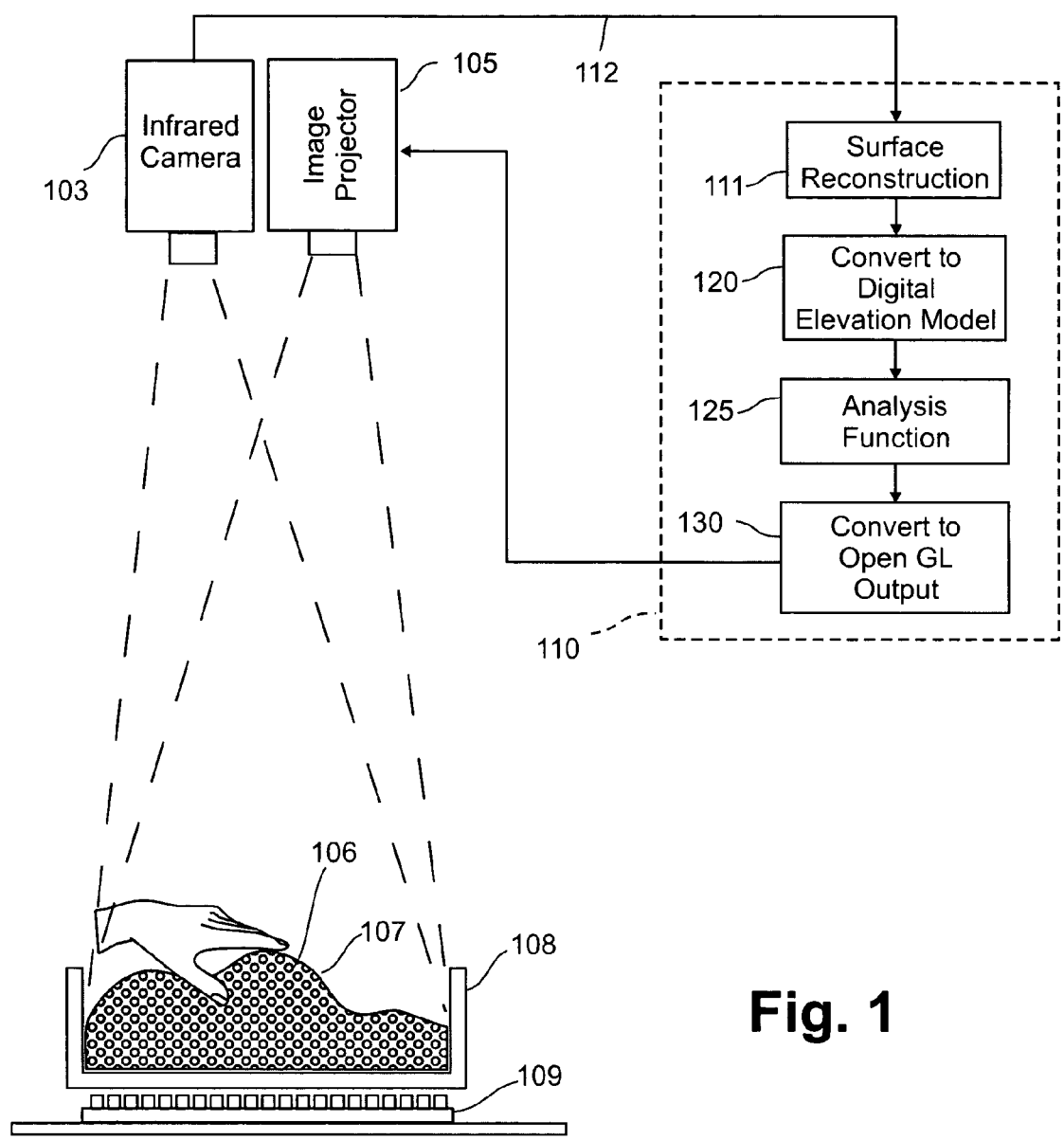
FIG. 1 is a schematic illustration of a specific embodiment of the invention.

The principle components of a preferred embodiment of the invention are shown in FIG. 1 and these components may be summarized as follows:

The Physical Modeling Material

A manually deformable bed of glass beads indicated at 106 in FIG. 1 is used to define the geometry of a modeled surface 107. The glass beads 106 are held in a box 108 whose underside is illuminated by an array of light emitting diodes (LEDs) 109. Other kinds of deformable translucent materials that are easily shaped and, after being shaped, retain their shape, could be substituted for the glass beads and the particular material is chosen depending on the type of surface to be modeled and the manner in which the position of the surface geometry is measured. The material chosen must also provide a suitable surface upon which an image representing the result data can be projected.

As disclosed in detail in the above-noted patent applications describing the Illuminated Clay system, plastic materials such as clay or plasticine may be used to define a surface whose position is determined by a laser scanner. Although the Illuminated Clay system possesses numerous advantages, the laser scanner is expensive and method places significant computational burdens on the processor.

The specific embodiment of the invention described in detail below employs a physical modeling material that consists of a bed of translucent glass beads which are individually movable, like the grains of sand in a sandbox, to define a surface whose geometry may be determined by optical measurements. Alternatively, individually movable translucent rectilinear blocks may be stacked in various ways to define a surface whose position may be determined using the same kind of optical measurement arrangement described below.

A Three-dimensional Position Sensor

A three dimensional sensor is required in order to capture the surface geometry of the physical modeling material. This sensor is preferably capable of capturing changes in the surface geometry in real-time, thereby allowing interactive exploration of the characteristics of the geometry by the user. The type of sensor selected may be dependent on the kinds of modeling material used as explained below. The preferred embodiment shown in FIG. 1 consists a ceiling mounted infrared camera 103, a video projector 105, a box 108 which contains a glass beads 106, an infrared LED panel 109 which illuminates the bottom of the glass beads, and a processor such as a standard personal computer (PC) 110 which computes the surface reconstruction algorithm and landscape simulations.

The LED panel 109 is made from 480 near infrared LEDs in a 2 cm grid pattern. LEDs. generally have a very narrow band of wavelength (±5 nm). The LEDs used in the panel 109 have a peak output at 880 nm with 60 m W sr$^{-1}$. The box 108 may include a transparent bottom for supporting the glass beads.

Figure 2:
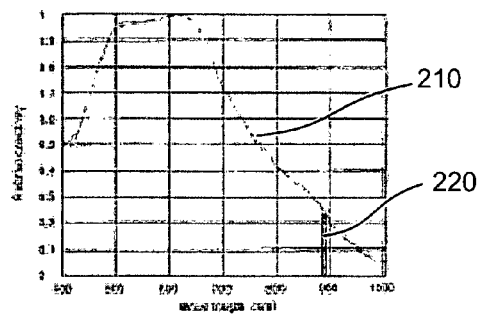
FIG. 2 is a graph showing the spectral response of the infrared camera 103.
Figure 3:
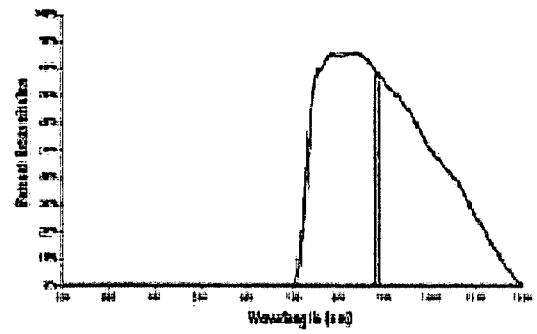
FIG. 3 is a graph showing the spectral response of the band-pass infrared filter used with the camera 103.

The box should have sidewalls of sufficient height to retain the bed of beads while permitting the bed to be shaped as desired. As discussed in connection with FIG. 7, the box may be supported on a turntable so that it and the shaped model may be readily rotated The infrared camera 103 may be implemented with a Hitachi KP-M2R CCD (charge coupled diode) camera which exhibits a good spectral response around near infrared as shown at 210 in FIG. 2. The vertical bar seen at 220 identifies the LCD output at 880 nm. Additionally, the camera 105 is equipped with a Hoya RT-830 IR band-pass filter with the cut-off wavelength at 700 nm as illustrated in FIG. 3. An external exposure control (not shown) is employed to obtain a sequence of variable exposure images under the control of the processor 110 as discussed in more detail below.

Figure 4:
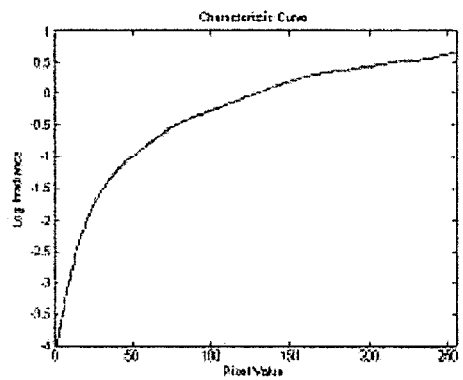
FIG. 4 is a graph of the non-linear transfer function used to correct the image data from the camera 103.
Figure 5:
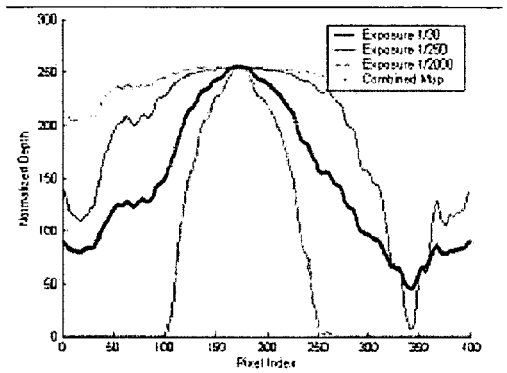
FIG. 5 is a graph showing how a sequence of images from the camera 103 taken with different exposure times are combined to form image data having a greater dynamic range.
Figure 6:
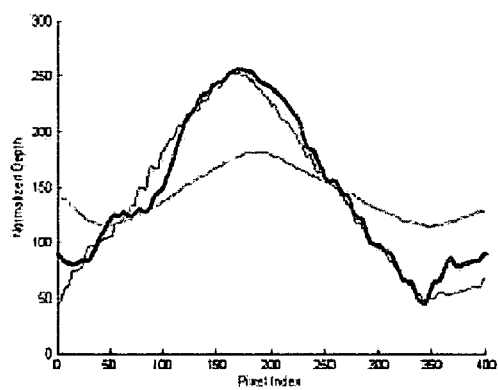
FIG. 6 is a graph comparing the geometric surface geometry data computed from the image data captured by the camera 103 with geometry data measurements acquired using a laser scanner.

The ceiling mounted infrared camera 103 and the LED panel 109 are used to capture the surface geometry 107 of the physical glass beads model 106. The LED panel 109 back-lights the glass beads 106 and the camera 103 captures a sequence of 8-bit images with different exposure times. A surface reconstruction algorithm at 111 executed by the processor 110 recovers a surface radiance map from the 8-bit images from the camera 103 given a nonlinear function of sensor response depicted in FIG. 4. Based on the radiance map, multiple images taken with different exposure times can be integrated to produce a high dynamic range image. Finally, this image is used at 120 (FIG. 1) to reconstruct the depth map of the model.

The LED array 109 and the camera 103 employ near infrared light in order to reduce the effect of ambient light in the room when the model is being used. The optical center of the camera 103 is aligned with the center of the model 140, which defines the z-axis in the world coordinate system. The world x-y plane is parallel to the image plane. The image projected by the projector 105 should be outside the infrared spectrum captured by the camera 103. Alternatively, the projector may be turned off momentarily while the camera shutter is open to prevent the projected image from interfering with the captured image.

A Data Processor

A conventional computer may be used perform the functions depicted within the dashed line rectangle 110. The processor converts a sequence of digital images from the camera 103 taken with different exposure times into an image with high dynamic range at 111, converts that image into geometric surface data in a standard form such as a Digital Elevation Model (DEM) as indicated at 120, processes the surface geometry data using one or more appropriate analysis functions as seen at 125, and converts the result data into suitable standard graphical format, such as OpenGL, for projection back onto the surface 107 of the glass beads 106 using the image projector 105.

The surface reconstruction algorithm shown at 111 in FIG. 1 addresses three problems:

(1) The camera response to the scene radiance (Wm$^{-2}$sr$^{-1}$) is nonlinear.

That means that the image intensities provided by the camera do not provide a direct measurement of the irradiance value (Wm$^{-2}$) on the scanned surface.

(2) The camera provides 8-bit image data which only represents a partial range radiance map.

(3) The modeling materials (e.g. glass beads) can be non-homogenous with complex light distributions. For example, photons, going into the objects from one side, will probably not come out from the perpendicular point on the other side.

A algorithm for recovering high dynamic range radiance map was originally presented by Debevec and Malik. See "Recovering high dynamic range radiance maps from photographs," by Paul E. Debevec and Jitendra Malik, Proceedings of the 24th annual conference on Computer graphics and interactive techniques, pages 369–378 (1997) ISBN:0-89791-896-7. The input to the algorithm is a sequence of digital images taken at a fixed point with different known exposure periods:

$$I_{ij} = f(E_i T_j) \quad (1)$$

In equation(1) above, we want to recover the logarithm of $f^1$ given image values $I_{ij}$, exposure time $T_j$ and unknown $E_i$. We can then write the Equation (1) in a linear optimization problem which we minimize an objective function G as follows:

$$G = \sum_{i=1}^{N}\sum_{j=1}^{P} [\ln f^{-1}(I_{ij}) - \ln E_i - \ln T_j]^2 \quad (2)$$

where P is the number of input images and N is the number of pixels selected from the images. As mentioned previously, the function $f$ is highly nonlinear at the points close to the sensor's zero and saturation response. To address this, we introduce a function w to weight off the relative importance of the pixel values when they are close to the interval points:

$$w(z) = \begin{cases} z - I_{\min} & \text{for } z \leq I_{mid} \\ I_{\max} - z & \text{for } z > I_{mid} \end{cases}$$

The Equation (2) becomes $$G = \sum_{i=1}^{N}\sum_{j=1}^{P} w(I_{ij})[\ln f^{-1}(I_{ij}) - \ln E_i - \ln T_j]^2 + \lambda \sum_{z=I_{\min}+1}^{I_{\max}-1} w(z)[(\ln f^{-1})''(z)]^2 \quad (3)$$

$$\text{subject to } \ln f^{-1}(I_{mid}) = 0$$

Where the second term is a regulation term to ensure a smooth function. Minimizing (3) is a straightforward a least-squares problem, which can be robustly solved using singular value decomposition method (SVD). As shown in the Debevec and Malik paper, cited above, N(P−1)>(I$_{max}$−I$_{min}$) is the condition for the overconstrained case. For example, given an input of 3 images, we want to choose at least 62 points which are evenly distributed over the range of all the intensity values.

We have taken multiple images with different exposure times, each of which gives us a particular range of radiance. Now, we want to combine them into one representation which provides the high dynamic range radiance map in the scene. Once the function $f$ is recovered, Equation (3) can be used to quickly convert pixel values to corresponding radiance values:

$$\ln E_i = \frac{\sum_{j=1}^{P} w(I_{ij})(\ln f^{-1}(I_{ij}) - \ln T_j)}{\sum_{j=1}^{P} w(I_{ij})} \quad (4)$$

Equation (4) above can be quickly computed for every pixel on the image. Combining the multiple images has the effect of reducing noise in the recovered radiance values. Additionally, given the input of 8-bit images, a radiance map can be obtained in a floating-point representation that contains more detail information in the high spatial frequency.

Once the radiance map is obtained, we can compute depth values by the exponential low of light attenuation. The radiance map, which we have recovered in the previous section, actually corresponds to the incoming irradiance to the CCD sensor. However, since the solid angles subtended by the source and the observer with respect to each other are small, the irradiance $E_{image}$ is proportional to the radiosity $E_{source}$ (mWm$^{-2}$) on the model's surface:

$$E_{image} = E_{source} \quad (5)$$

Moreover, Equation (5) also ignores the light scattering issue. In the real world, the photons leaving a point source may be scattered to directions other than the column from the point to the corresponding pixel on the image plane. We assume that the scattered photons will not enter other columns, that is, they will not contribute to the irradiance value of other pixels.

Our fundamental law to reconstruct the volumetric depth from the surface radiosity is based on the Bouguer's light attenuation function [Pierre Bouguer 1729, as noted by Debevec and Malik, cited above], which tells us the exponential correspondence between the depth of an object and the change of irradiance as a light beam travels through it:

$$E = E_0 e^{-\beta d} \quad (6)$$

where $E_0$ is the irradiance at the depth 0, E is the irradiance at the depth d, and $\beta$ is called the "total scattering coefficient" which depends on material qualities. By plugging Equation (4) and (5) into (6), we get:

$$\beta d = \ln E_0 - \ln E_{image} \quad (7)$$

Note that we are only able to reconstruct depth values up to a scale factor B and a shift factor $\ln E_0$, which can be initialized at the system calibration step. Furthermore, as mentioned above, the recovered $\ln E_{image}$ is also up to a scale factor as well as the estimation from $E_{image}$ to $E_{source}$. Here, we have merged those constant scalars with B and $\ln E_0$.

So far, the depth equation (7) has assumed that the exponential law of light attenuation is an appropriate estimation to our system. However, the law is based on the assumption of homogenous materials. In contrast, large-scale landscape models are usually made from packed spherical materials, such as sand and glass beads. For those materials, the internal light distribution is a complex scattering pattern and a photon going into a object may not come out from the perpendicular point on the other side of the object. This situation is similar to the tomography case which deals with the photon path distributions in turbid media. It has been shown in medical imaging literature that the probability of a photon coming out from the turbid media is a Gaussian distribution with the mean at the corresponding perpendicular point. Comparing the results with depth measurement data obtained using an accurate laser scanner confirms the light attenuation law results a reasonable depth estimation.

In case that the exponential law does not hold, we provide a look-up table (LUT) which directly indexes a depth value from given irradiance. The LUT can be initially built by comparing the recovered high dynamic range radiance map with a laser-scanned model captured from the same physical model. The LUT is a 1-D array which contains 225 integer entries, and irradiance values other than entry values can be computed by linear interpolation between two entries.

An Image Projector

The image projector as seen at 105, which may take the form of a conventional LCD, CRT or DLP video projector of the type used to display computer generated graphical data, is employed to project color (or gray-scale) pixel data representative of the result data produced by the processor back onto the surface of the physical modeling material and onto a surrounding projection surface provided by platform 151. The video projector 105 is calibrated with the infrared camera 103 to allow projected pixel values to correspond with points on the surface 107 of the beads 106. The projector 105 may take the form of a standard Mitsubishi 640×480 LCD projector which casts the result of landscape analysis functions back on to the surfaces of the physical model 106. LCD projector 105 projects an image which is outside the bandpass of the infrared filter on camera 103 so that the projected image does not interfere with the capture of surface geometry data.

The video projector 105 is preferably positioned along side the infrared camera 103 above the physical modeling material seen at 108 as seen in FIG. 1. In an alternative arrangement, the camera 103 and the projector 105 may be located at the same optical origin to avoid problems of shadowing, occlusion and image distortion. This may be achieved using a coated mirror that is transparent to light from the laser scanner 103 and reflective of the visible spectrum from the projector 105, as explained in the patent applications describing "Illuminated Clay." However, tests have shown that, from a distance of 2 meters and with an operating volume of approximately 0.5×0.5×0.5 m, the simpler arrangement shown in FIG. 1 in which the projector and camera are positioned along side each other performs adequately since the captured and projected rays can be considered to originate from the same source. The camera/projector pair may thus both be housed inside a casing (not shown) at a height of approximately 2 meters above the surface of the beads 108.

The combination of the LED array and camera determines the geometric position of the surface 107 of the glass beads with sufficient accuracy Standard Data Formats and Analysis Routines The Digital Elevation Model data created at 120 is a digital representation of a topographic surface that takes the form of a regular grid of spot heights. The DEM data is an array of values each of which specifies the elevation of the topographic surface at a particular location in two-dimensional array of locations. The DEM is the simplest form of standard digital representation of topography and is used by the U.S. Geological Survey. DEM data can be processed using available analysis functions to determine the attributes of a terrain, such as its elevation, slope and aspect at any point. In addition, the DEM data can be processed in standard ways to find features on the terrain, such as drainage basins and watersheds, drainage networks and channels, peaks and pits and other landforms.

The present invention may accordingly be used to model an existing or modified landscape and to display its attributes on the modeled terrain. For example, the principal components of a drainage basin are its topographic form and the topologic structure of its drainage network. The quantification of these components is tedious and time consuming when accomplished manually. Using the invention, the drainage characteristics of landscape, and the manner in which those characteristics can be varied by altering in the shape of the terrain model, may be explored in real time with the results being visually displayed in three-dimensions in an readily understandable way.

Specific standard analysis functions which are of value to the landscape designer and can be performed at 125 include the following:

Slope Variation & Curvature Analysis. A thorough understanding of the slope and curvature of landscape topography is extremely important in almost all landscape analysis. For example slope gradients affect the positioning of roads, building, power-lines and so forth. The absolute value of this function returns the slope at a given point in the topography. The slope value can be displayed on the model using a color map ranging from red to purple, where the two extremes correspond to the maximum and minimum slope values.

Shadows & Solar Radiation Analysis. By processing the DEM data, the processor can simulate the positions of shadows in the landscape. Shadow angles are calculated for a given sun position and are projected onto the model as black and white image. By changing this sun position over time it is possible to view lighting conditions through the passage of a day or year. It also becomes possible to determine the total amount of solar radiation at a given point on a site of known latitude and longitude. This kind of information may, for example, help the user to position crops, housing complexes, solar energy collectors and other sunlight affected insertions in the landscape. These values can be integrated to form isolines, which can also be projected onto the model. The shadow algorithm was developed by Ratti and Richens as described in "Urban texture analysis with image processing techniques, Proceedings of CAADFutures99 (Atlanta, GE, May 1999) The total solar exposure algorithm was adapted from the GRASS GIS (Geographic Resources Analysis Support System) open source, Geographical Information System (GIS) library with raster, topological vector, image processing, and graphics production functionality which is generally available under GNU licensing on the World Wide Web.

View Shed. It is often crucial to know the precise C from any given position in the landscape. This field of view is known as the view shed and this landscape analysis can be performed by passing the DEM through an image-processing algorithm that generates the areas that are visible based on a point in the model selected by the user. Applications are varied, from helping to decide the positioning of line-of-sight telecommunication devices (such as a microwave transceivers) to the passage of routes that maximize or minimize views (scenic paths or the construction high ways that pass areas of housing).

Least cost of passage. This analysis function can help the user determine the most appropriate positioning of a roadway or path, since it indicates trajectories on the landscape that minimizes the cost of passage. This cost can be calculated to take into account different parameters such as the actual cost of construction or the cost in time taken to complete a particular route. In addition information relating to the necessary volume of cuts and fills on the landscape can be calculated and displayed in real time for the benefit of the user.

Water flow and land erosion. The representation of water flow and erosion in the landscape helps the user in sitting housing complexes, dams, roads or other interventions while visualizing the (often non-intuitive) consequences of these interventions. In particular, our land erosion algorithm can show the amplified effects of small modifications in the landscape and was adapted from the open source GRASS library.

These and other routines for processing DEM data are described, for example, in Terrain Analysis: Principles and Applications edited by John P. Wilson John C. Gallant, John Wiley & Sons; 1st edition (2000) ISBN: 0471321885 and in Digital Elevation Model Technologies and Applications: The DEM Users Manual edited by Dave F. Maune, Asprs Publications (2001) ISBN: 1570830649.

As illustrated at 130, the result data from the surface analysis function performed at 125 is preferably converted into standard OpenGL form at 130 for projection onto the work surface 107 by a conventional projector 105. OpenGL is a widely used and supported 2D and 3D graphics application programming interface (API) that incorporates a broad set of rendering, texture mapping, special effects, and other powerful visualization functions. See OpenGL Programming Guide: The Official Guide to Learning OpenGL, Version 1.4, Fourth Edition by the OpenGL Architecture Review Board, Addison-Wesley Pub Co (2003) ISBN: 0321173481, and http://www.opengl.org.

Thus, by capturing surface position data into standard DEM format at 120, it is possible to analyze the characterizes of the modeled surface using standard analysis functions at 125. By placing the results of this analysis into standard OpenGL format as seen at 130, the result data can be rendered using standard OpenGL visualization, animation and rendering functions and displayed in three dimensions onto the model surface.

Work Table and Output Displays

Figure 7:
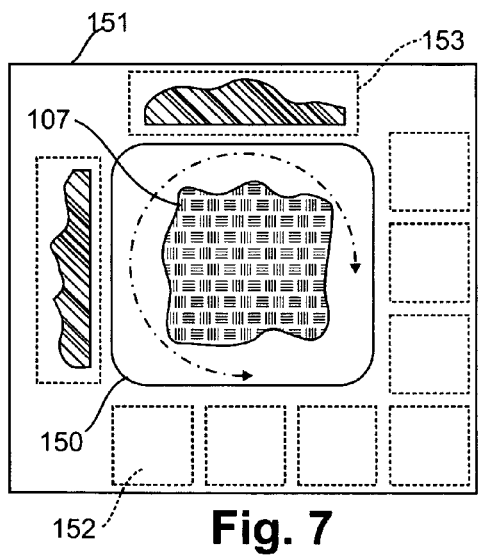
FIG. 7 is an overhead plan view of the modeling surface and the surrounding worktable surface used to display data to the user.

As shown in the overhead view of FIG. 7, the box 108 containing the glass beads 106 is preferably supported on a rotatable turntable 150 above a platform 151 which provides a smooth white surface suitable for projection and a platform onto which the turntable 150 is placed. This turntable 150 can be rotated to the desired viewing angle. Two sides of the surface provided by the platform 151 are illuminated with thumbnail images as illustrated at 252 from a library of landscape analysis functions. These thumbnails remain actively displayed, updating with changes in the model shape, allowing the easy comparison of different landscape analysis results. The remaining two edges of the work surface of platform 151 are used to project cross sections of the model as illustrated at 153, enhancing the user's three-dimensional understanding of the terrain.

A visible cursor moved by a mouse may be used to select points on the model, and quantitative information relating to the points on the model selected by the mouse may be displayed at the corners of the platform 151. These variables dynamically adjust according to the simulation function that is currently in use. For example the displayed numbers indicate factors such as "Slope: 64", "Water Shed: 22.3 mm" and "Erosion: 7.4 mm/year" depending on the current landscape analysis function.

The graphical elements projected onto the platform surface are preferably positioned around the periphery of the platform 151 to allow users to approach it from all sides, promoting collaborative use by several participants in the design process.

Operating Modes

The preferred embodiment of the invention described above can operate in three different modes, called "SCANcast," "CUTcast" and "CADcast."

The SCANcast mode is the default operating mode for the system and, as described above, allows the geometry of a given physical form to be scanned to obtain input data which is then analyzed and the analysis results are projected back onto the form surface.

While the SCANcast mode offers the ability to display information on the surface of a three-dimensional model, it does not allow three-dimensional information relating to conditions above or below the surface of the model to be displayed. For example, the SCANcast mode does not provide a means to represent airflow, temperature gradients or subterranean geological formations to be displayed on the model. If, for example, the designer of a wind farm wishes to know the precise wind speed at a point three meters above the surface of the landscape, they need to insert a surface for projection three meters above the surface of the model topography. However, by adding that surface to the landscape scene they are affecting the geometry of the model and therefore altering the simulated wind speed at the very point the wish to measure.

The CUTcast operating mode solves this problem by offering the user the ability to "freeze" the geometry of a given scene or landscape for the purposes of 3-dimensional simulation. The user is then free to add surfaces for projection at will, and to 'cut' through any portion of the simulation with out affecting the results. Any surface can be used to make this cut, whether it is the modified surface configuration of the model, the surface of a stiff sheet of translucent plastic or cardboard, or indeed a more complex form such as a sphere or even the user's hand.

In the CUTcast mode, the deformable surface is first used to define the geometry of a physical form to be modeled. This first surface is scanned to provide input data which is then processed to generate a three-dimensional voxel dataset which describes the characteristics of the space surrounding the surface. The shape of the deformable surface is then altered to define a second surface which acts as a "cutting surface" to identify data values within the voxel dataset which are then displayed on second surface. The processor generates the voxel dataset representing the characteristics of the first modeled surface and a three dimensional region surrounding said surface, and then the scanner is used to measure the position of a second cutting surface which selects a portion of said voxel dataset defined by the position of the cutting surface relative to said original modeling surface.

The CUTcast mode employs the principles described in above noted U.S. patent application Ser. No. 10/696,474 filed on Oct. 29, 2003 disclosing the Phoxel Space Interface. As explained in that application, a physical modeling surface may be manipulated to enable a user to intuitively explore and visualize complex three dimensional datasets by manipulating the position and shape of the modeling surface. By altering the shape of the physical material, the user selects the geometry of a free form surface that is used as a cutting surface to intersect a voxel dataset. The intersected voxel values are then converted to image data that is projected back onto the surface of the physical material. In the SCANcast mode, the present invention may be used to model a given geometry to create a voxel dataset describing the three dimensional space that surrounds the model, and then, in the CUTcast mode, the modeling surface may be again altered to define a cutting surface that defines a different geometry spaced from the first surface that allows the user explore the characteristics of the model at locations near to but spaced from the first surface that defined the physical geometry being modeled.

The third mode of operation, CADcast, is used to facilitate the creation of a modeling surface that accurately portrays a desired landscape site or other form. The modeling and analysis of a physical structure may require the production of an accurate scale model of that structure. However, constructing this model in an accurate and efficient manner may could be difficult and time consuming. The CADcast mode allows the user to make precise three-dimensional models using standard materials such as clay or plasticine. The CADcast mode operates by comparing the scanned position of the modeling surface with a desired topography stored in computer memory as a 'CAD' (Computer Aided Design) file or DEM data. This source of this computer model could range from photogramtry data purchased from GIS sources, may be generated from the traced contour lines of conventional topographic maps, or may be produced by a variety of existing CAD tools.

In the CADcast mode, the user places a deformable material such as clay material into the workspace. The current surface geometry is scanned, compared with the desired surface geometry, and then each position on the modeling surface is illuminated with a color indicating when it is within or outside the volume of the CAD model. By varying this color, for example from purple to yellow inside the volume and from orange to blue outside the volume, the CADcast mode indicates the level of disparity between the physical and CAD models. Thus, if an area of the physical model is highlighted in orange, the person shaping the modeling surface is informed that the area is outside the volume of the digital model and is relatively for from being accurately registered. As material is removed from the model the color of the surface becomes progressively bluer until the surface of the physical model and digital model are the same. At this point there is a discreet change to the color red to indicate that a match within acceptable tolerances between the surface of the physical and digital models has been reached. The CADcast mode accordingly permits the user to rapidly construct accurate models that accurately match digital models of existing landscapes or other physical structures.

CONCLUSION

It is to be understood that the specific methods and apparatus described above are merely illustrative applications of the principles of the invention. Numerous modifications may be made to these methods and the apparatus without departing from the true spirit and scope of the invention.

What is claimed is:

1. Apparatus for modeling and evaluating the characteristics of three-dimensional forms which comprises, in combination,
   a deformable translucent material that may be easily manually shaped to define a surface that can be shaped and once shaped retains its shape,
   means for transmitting electromagnetic energy through said material to produce radiation from individual regions of said surface, said radiation from each given one of said regions having an intensity that is related to the position of said given region,
   means for measuring the intensity of said radiation to produce surface geometry data indicative of the shape and position of said surface, means for processing said surface geometry data to generate result data which specifies one or more characteristics of said surface at different points on or near said surface, and
   means for projecting an image corresponding to said result data onto said surface.

2. Apparatus for modeling and evaluating the characteristics of three-dimensional forms as set forth in claim 1 wherein said deformable material comprises a bed of translucent beads.

3. Apparatus for modeling and evaluating the characteristics of three-dimensional forms as set forth in claim 1 wherein said deformable material is supported on a rotatable turntable.

4. Apparatus for modeling and evaluating the characteristics of three-dimensional forms as set forth in claim 1 wherein said means for measuring is a three-dimensional optical distance measuring device.

5. Apparatus for modeling and evaluating the characteristics of three-dimensional forms as set forth in claim 1 wherein said means for measuring is a camera for capturing a radiation image produced by said radiation from individual regions of said surface.

6. Apparatus for modeling and evaluating the characteristics of three-dimensional forms as set forth in claim 5 wherein electromagnetic energy is infrared light energy.

7. Apparatus for modeling and evaluating the characteristics of three-dimensional forms as set forth in claim 5 wherein said means for projecting an image corresponding to said result data is located near said camera.

8. Apparatus for modeling and evaluating the characteristics of three-dimensional forms as set forth in claim 7 wherein said deformable material is a bed of translucent beads that is illuminated from beneath by a source of said electromagnetic energy and wherein said camera and said means for projecting an image are both located above said bed of translucent beads.

9. Apparatus for modeling and evaluating the characteristics of three-dimensional forms as set forth in claim 5 wherein said camera produces digital image data.

10. Apparatus for modeling and evaluating the characteristics of three-dimensional forms as set forth in claim 9 wherein said means for measuring the intensity of said radiation further comprises means for converting said digital image data into said surface geometry data.

11. Apparatus for modeling and evaluating the characteristics of three-dimensional forms as set forth in claim 10 wherein said means for converting said digital image data into said surface geometry data further comprises means for compensating for the nonlinear relationship between the intensity of the radiation for each given one of said regions and the position of said given region.

12. Apparatus for modeling and evaluating the characteristics of three-dimensional forms as set forth in claim 9 wherein camera produces a sequence of radiation image data captured at different exposure times and wherein said means for measuring the intensity of said radiation further comprises means for combining said sequence of radiation image data to produce said surface geometry data.

13. Apparatus for modeling and evaluating the characteristics of three-dimensional forms as set forth in claim 12 further comprises means for compensating for the nonlinear relationship between the intensity of the radiation for each given one of said regions and the position of said given region.

14. Apparatus for modeling and evaluating the characteristics of three-dimensional forms as set forth in claim 1 wherein said means for processing said surface data comprises means for translating said surface geometry data into a standard geometry format and means for selecting and executing an analysis routine from a library of available analysis routines for processing said data in said first standard form to generate said result data.

15. Apparatus for modeling and evaluating the characteristics of three-dimensional forms as set forth in claim 14 wherein said means for processing further comprises means for representing said result data in a standard graphical display format and for thereafter processing said result data in said standard graphical display format into image data supplied to said means for projecting an image corresponding to said result data onto said surface.

16. Apparatus for modeling and evaluating the characteristics of three-dimensional forms as set forth in claim 14 wherein means for processing includes means for generating different sets of result data using corresponding ones of said available analysis routines, and wherein said means for projecting projects a plurality of images concurrently, each of which corresponds to one of said sets of result data, whereby a user can simultaneously view different characteristics of said said surface.

17. Apparatus for modeling and evaluating the characteristics of three-dimensional forms as set forth in claim 1 wherein said means for processing further comprises means for representing said result data in a standard graphical display format and for thereafter processing said result data in said standard graphical display format into image data supplied to said means for projecting an image corresponding to said result data onto said surface.

18. Apparatus for modeling and evaluating the characteristics of three-dimensional forms as set forth in claim 1 wherein said surface geometry data comprises an array of values each of which specifies the elevation of said surface at a particlular location in two-dimensional array of locations.

19. Apparatus for modeling and evaluating the characteristics of three-dimensional forms as set forth in claim 18 wherein said surface geometry data conforms to the Digital Elevation Model for representing topgraphical data.

20. Apparatus for modeling and evaluating the characteristics of three-dimensional forms as set forth in claim 19 wherein said means for processing said surface geometry data comprises means for selecting and executing a routine in a library of routines for processing said data into result data.

21. Apparatus for modeling and evaluating the characteristics of three-dimensional forms as set forth in claim 20 wherein said surface is a topological landscape surface and wherein said library includes for generating result data which specifies characteristics of said surface selected from a group consisting of: slope, curvature. shadowing, solar radiation, field of view, cost of passage, water flow and land erosion characteristics.

22. Apparatus for modeling and evaluating the characteristics of three-dimensional forms as set forth in claim 1 further comprising means for storing said result data as a voxel dataset representing the characteristics of said surface and a three dimensional region surrounding said surface, means for measuring the position of a second surface, and means for projecting an image corresponding to a selected portion of said voxel dataset defined by the position of said second surface relative to said first surface.

23. The method for modeling and evaluating the characteristics of three-dimensional forms which comprises, in combination, the steps of:
   manually shaping a deformable translucent material with ease to define a surface model that can be shaped and once shape retains its shape,
   transmitting electromagnetic energy through said material to produce radiation from individual regions of said surface model, said radiation from each given one of said regions having an intensity that is related to the position of said given region,
   measuring the intensity of said radiation to produce shape data indicative of the shape and position of said surface model,
   processing said shape data to generate result data which specifies one or more characteristics of said surface model at different points on or near said surface, and
   projecting an image corresponding to said result data onto said surface model.

24. The method for modeling and evaluating the characteristics of three-dimensional forms as set forth in claim 23 wherein said deformable translucent material is a bed of translucent beads.

25. The method for modeling and evaluating the characteristics of three-dimensional forms as set forth in claim 24 wherein said step of transmitting said electromagnetic energy comprises transmitting infrared light through said material from an array of light emitting diodes positioned beneath said bed of translucent beads.

26. The method for modeling and evaluating the characteristics of three-dimensional forms as set forth in claim 25 wherein said step of measuring the intensity of said radiation to produce shape data comprises using a digital camera to capture digital image data representing the intensity of said radiation.

27. The method for modeling and evaluating the characteristics of three-dimensional forms as set forth in claim 26 wherein said step of using said digital camera comprises capturing a sequence of radiation image data taken at differing exposure times and combining said sequence of radiation image data to produce composite image data having a greater dynamic range.

* * * * *